US010642811B1

(12) United States Patent
Liddell et al.

(10) Patent No.: US 10,642,811 B1
(45) Date of Patent: May 5, 2020

(54) ADDRESS-BASED WAVEFORM DATABASE ARCHITECTURE

(71) Applicant: Xilinx, Inc., San Jose, CA (US)

(72) Inventors: David K. Liddell, Longmont, CO (US); Roger Ng, Campbell, CA (US); Hem C. Neema, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 848 days.

(21) Appl. No.: 14/482,853

(22) Filed: Sep. 10, 2014

(51) Int. Cl.
*G06F 16/00* (2019.01)
*G06F 16/22* (2019.01)
*G06F 16/28* (2019.01)

(52) U.S. Cl.
CPC ........ *G06F 16/2282* (2019.01); *G06F 16/289* (2019.01)

(58) Field of Classification Search
CPC ......... G06F 17/30339; G06F 17/30607; G06F 17/5022; G06F 17/5031; G06F 16/2282; G06F 16/289
USPC .................... 707/648, 812, 803; 703/13, 14; 717/125; 326/93, 39
See application file for complete search history.

(56) References Cited

U.S. PATENT DOCUMENTS

| | | | | |
|---|---|---|---|---|
| 6,675,310 B1* | 1/2004 | Bloom | ................ | G06F 17/5022 713/400 |
| 6,922,665 B1* | 7/2005 | Guccione | ............ | G06F 17/5022 703/14 |
| 7,085,702 B1* | 8/2006 | Hwang | ............... | G06F 17/5045 326/93 |
| 7,330,808 B1* | 2/2008 | Jorgensen | ........... | G06F 17/5022 703/14 |
| 7,433,813 B1* | 10/2008 | Ballagh | ............... | G06F 17/5022 326/39 |
| 7,558,719 B1* | 7/2009 | Donlin | ................ | G06F 17/5009 703/14 |
| 7,684,968 B1* | 3/2010 | Szedo | ................. | G06F 17/5022 703/14 |
| 8,326,591 B1* | 12/2012 | Cai | ..................... | G06F 17/5036 703/13 |
| 9,129,041 B1* | 9/2015 | Cormier | ............ | G06F 17/30979 |
| 9,329,991 B2* | 5/2016 | Cohen | ................. | G06F 12/0246 |

(Continued)

OTHER PUBLICATIONS

Xilinx; "Synthesis and Simulation Design Guide"; UG626 (v 11.4); Dec. 2, 2009; 172 pages.*

(Continued)

*Primary Examiner* — Monica M Pyo
(74) *Attorney, Agent, or Firm* — Kevin T. Cuenot (57) ABSTRACT

A waveform simulation system with a waveform database architecture satisfies different requirements of different waveform simulation tools. The waveform simulation system includes a waveform database configured to store one or more mappings that map one or more design objects to one or more memory addresses. The waveform simulation system also includes a packet processing module configured to receive simulation data from a simulation tool. The packet processing module is configured to translate the simulation data into translated simulation data that is independent of implementation details of the one or more design objects, based at least in part on the one or more mappings. In some cases, the translated simulation data may include event data stored in the waveform database.

19 Claims, 8 Drawing Sheets

(56) References Cited

U.S. PATENT DOCUMENTS

| | | | | |
|---|---|---|---|---|
| 2002/0019969 A1* | 2/2002 | Hellestrand | ............ | G06F 11/261 |
| | | | | 716/102 |
| 2012/0109895 A1* | 5/2012 | Zwilling | ............. | G06F 11/1471 |
| | | | | 707/648 |
| 2014/0005999 A1* | 1/2014 | Agarwala | ............ | G06F 17/5045 |
| | | | | 703/14 |

OTHER PUBLICATIONS

By Xilinx; "System Generator for DSP Version 9.1.01"; https://cse.sc.edu/~jbakos/491/documentation/sysgen_ug.pdf; Mar. 19, 2007; 939 pages.*

By Xilinx; "System Generator for DSP UG 640 (v 14.2)"; https://japan.xilinx.com/support/documentation/sw_manuals_j/xilinx14_2/sysgen_user.pdf; Jul. 25, 2012; 424 pages.*

\* cited by examiner

ADDRESS-BASED WAVEFORM DATABASE ARCHITECTURE

TECHNICAL FIELD

The subject disclosure relates to waveform database architectures, and more specifically, to storage architectures for waveform simulations.

BACKGROUND

An electronic system may include different objects, such as circuits, buses, clocks, etc. Sometimes, in the design of an electronic system, different objects may be simulated using a simulation tool to obtain waveform simulation. Different simulation tools may be used for waveform simulation and viewing. For example, Vivado™ Simulator, Vivado™ Logic Analyzer, and System Generator™, all available at Xilinx, San Jose, Calif., are waveform tools that may be used to simulate and view waveforms, as well as to store waveform data for later review. Different tools may use different hardware definition languages (HDLs). Also, different tools may process waveforms in different ways. For example, some tools may output waveform data that is time-based, while other tools may output waveform data that is sample-based. Also, other tools may output waveform data that is clock-based.

SUMMARY

A method for storing data in a waveform database includes: obtaining a mapping that maps a design object being simulated to one or more memory addresses; receiving simulation data, wherein the simulation data corresponds to a change in a signal associated with the design object; translating, using a translator, the received simulation data based at least in part upon the mapping, wherein the translated simulation data has a format that is independent of an implementation detail of the design object; and storing the translated simulation data in the waveform database.

A method of retrieving data from a waveform database includes: receiving a request from a waveform viewer for a waveform of simulation data; identifying one or more memory addresses in a memory corresponding to the requested waveform based at least in part on a mapping that maps one or more design objects to the one or more memory addresses; determining one or more event data based on the one or more identified memory addresses, wherein the act of determining the one or more event data comprises accessing the one or more event data from the waveform database that stores the one or more event data in a format that is independent of implementation detail of the one or more design objects; and processing the one or more event data for presentation.

A waveform simulation system includes: a waveform database configured to store one or more mappings that map one or more design objects to one or more memory addresses; and a packet processing module configured to receive simulation data from a simulation tool, wherein the packet processing module is configured to translate the simulation data into translated simulation data that is independent of implementation details of the one or more design objects based at least in part on the one or more mappings; wherein the translated simulation data comprises event data stored in the waveform database.

Other aspects and features will be evident from reading the following detailed description.

BRIEF DESCRIPTION OF THE DRAWINGS

The drawings illustrate the design and utility of various examples, in which similar elements are referred to by common reference numerals. These drawings are not necessarily drawn to scale. In order to better appreciate how the above-recited and other advantages and objects are obtained, a more particular description of the examples will be rendered which are illustrated in the accompanying drawings. These drawings depict only examples and are not therefore to be considered limiting of the scope of the claims.

FIG. 3-1 illustrates an example of a format for data stored in a waveform database.

FIG. 3-2 illustrates buckets for storing event data.

FIGS. 5-1 and 5-2 illustrate representations of a Verilog bus in memory.

DETAILED DESCRIPTION

Various features are described hereinafter with reference to the figures. It should be noted that the figures are not drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example needs not have all the aspects or advantages shown. An aspect or an advantage described in conjunction with a particular example is not necessarily limited to that example and can be practiced in any other examples, even if not so illustrated, or if not explicitly described.

A waveform database (WDB) architecture that satisfies different requirements of different waveform simulation tools is described herein. The waveform database architecture may be implemented in a waveform simulation system. In some cases, the waveform simulation system may be configured to run in a "live" mode and a "static" mode. In the "live" mode, a waveform simulation tool (e.g., HDL simulator, Vivado™ Simulator, Vivado™ Logic Analyzer, System Generator™' etc.) is used to run a waveform simulation kernel process. As the simulation runs, event data are produced corresponding to changes in the waveform. These event data may be stored in a waveform database, and may also be observed and dynamically displayed by a waveform simulation viewer (e.g., window). In some cases, a user may perform certain actions using the waveform simulation viewer during the simulation process. For example, a user may operate the waveform simulation viewer to probe the waveform or to change the values of one or more simulation objects. The waveform simulation viewer may generate output based on the user operation, which output is received by the waveform simulation tool. The waveform simulation tool may then use the output from the waveform simulation viewer to update the simulation accordingly.

On the other hand, in the "static" mode, a user may use the waveform viewer to view previously created waveform data. A user may specify, using the waveform viewer, which signals/probes he or she wishes to view, as well as define the samples/time periods for the viewing. For example, a user may request to view a certain waveform between the simulation times of 100 ns and 500 ns. The corresponding data is then identified and retrieved from the waveform database to be viewed by the user on a waveform viewer.

Figure 1:
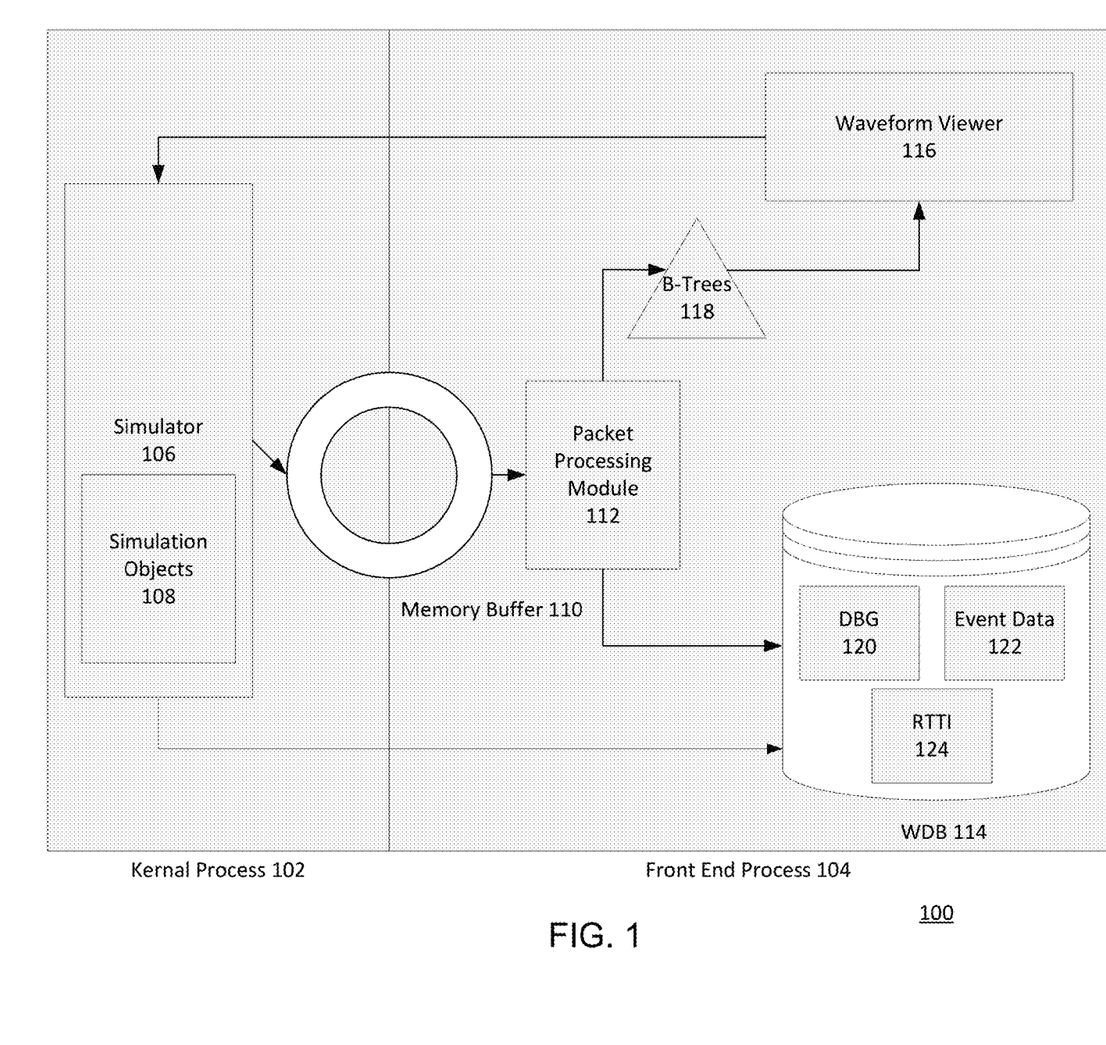
FIG. 1 illustrates a waveform simulation system.

FIG. 1 illustrates a waveform simulation system 100. The waveform simulation system 100 includes a simulator 106, a memory buffer 110, a packet processing module 112, a waveform database 114, and a waveform viewer 116 in communication with the waveform database 114.

The simulator 106 may be any simulation tool, and is configured to operate on one or more simulation objects (i.e., design objects being simulated) 108. By means of non-limiting examples, the simulator 106 may be hardware description language (HDL) simulator, Vivado™ Logic Analyzer, Vivado™ Simulator, System Generator™, etc. In some cases, the simulation objects 108 may correspond to circuits, buses, clocks, and/or any other type of object that may be part of a design to be simulated, and may be implemented using Verilog, SystemVerilog, VHDL, or any other HDL. Verilog is a HDL used to model electronic systems. VHDL is a hardware description language used in electronic design automation to describe digital and mixed-signal systems such as field-programmable gate arrays and integrated circuits. VHDL may also be used as a general purpose parallel programming language in some cases. SystemVerilog is a combined HDL and hardware verification language based on extensions to Verilog. In other cases, the simulation objects 108 may correspond to elements of a physical circuit, as captured by circuit-testing hardware. For example, a circuit debugging tool (e.g., Vivado™ Logic Analyzer) may insert probes into a circuit on a chip that is positioned on a development board. The probes connect circuit elements to ports on the chip in such a way that the waveforms on the circuit elements may be captured from a processing unit, such as a computer, connected to the chip. In this example, simulation objects 108 may be software representations of the circuit elements to which the probes are connected.

The memory buffer 110 is coupled between the simulator 106 and the packet processing module 112. The memory buffer 110 is configured to receive simulation data from the simulator 106, and transmit the simulation data to the packet processing module 112. In some cases, the memory buffer 110 may be a circular buffer. In other cases, the memory buffer 110 may be other types of buffer. In further cases, the memory buffer 110 is optional, and the waveform simulation system 100 may not include the memory buffer 110. In such cases, the simulation data from the simulator 106 may be transmitted to the packet processing module 112 directly or through another component of the waveform simulation system 100.

The packet processing module 112 is configured to receive the simulation data from the memory buffer 110 or from the simulator 106, process the simulation data, and transmit the processed simulation data for storing in the waveform database 114. In some cases, the simulation data may be partitioned and buffered before being stored in the waveform database 114.

In some cases, the packing processing module 112 may also transmit the simulation data to the waveform viewer 116 for viewing by a user of the waveform viewer 116. The transmission of the simulation data to the waveform viewer 116 may occur simultaneously with, before, or after, the transmission of the simulation data for storage at the waveform database 114. In some cases, the packet processing module 112 is configured to organize the simulation data into one or more B-trees or other type of data structure. This may allow for easy retrieval and/or transmission of the simulation data. For example, a user may request to view a particular set of samples for a particular waveform, such as, waveform A between the sample times of 0 ns and 200 ns. By organizing the simulation data in a B-tree, simulation data corresponding to the requested set of samples may be quickly retrieved and displayed.

The waveform viewer 116 may include any type of program that can be used to display a simulated waveform to a user. In some cases, the waveform viewer 116 is configured to process signals from the packet processing module 112, and to generate output signals for viewing by the user. The waveform viewer 116 may include a display for displaying information. Also, in some cases, the waveform viewer 116 may provide a user interface for allowing a user to enter input (e.g., commands). The user input is processed by the waveform viewer 116, and is then transmitted by the waveform viewer 116 to the packet processing module 112, which performs processing based on the user input. By means of non-limiting examples, the user input may be one or more commands for instructing a probing of the waveform being simulated, for changing values of one or more of the simulation objects 108, etc., or a combination of the foregoing.

The simulation data stored in the waveform database 114 may be any data generated by the simulator 106, and/or any data derived from the output of the simulator 106, and/or any data derived from the output of the packet processing module 112. In some cases, the simulation data stored in the waveform database 114 may include debugging data (DBG) 120, event data 122, and run-time type information (RTTI) 124.

The DBG 120 contains data describing the structure of the design that the waveform simulation data is being generated for. These may include information on the circuits, signals, and probes of the design.

The event data 122 contains data on the actual event(s) returned by the simulation performed by the simulator 106. For example, the event data 122 may indicate that a value of a particular signal (e.g., signal A) has changed (e.g., to value N) at a particular time (e.g., time T) in an event. In some cases, the DBG 120 may include mappings that map the design objects 108 to one or more addresses in a memory. This allows the event data 122 for the different design objects 108 to be in a format that is independent of the specific implementation of the design objects being simulated, and to be instead generically associated with addresses within the memory. Formats for storing events will be described in detail below.

The RTTI 124 defines the kind of values that design objects listed in the DBG 120 can hold. Also, in some cases, the RTTI 124 may include information that describes for each object referenced in the DBG 120, how to interpret the values associated with the addresses in the event data 122. Thus, the information in the RTTI 124 enables the waveform viewer 116 to take the address-based raw binary data from the event data 122 in the database, and translate them into human-readable form. In further cases, the RTTI 124 lets the waveform viewer 116 know how to decode certain information, such as bit information, using a encoding scheme.

The waveform simulation system 100 may selectively operate in a "live" mode or a "static" mode. In the "live" mode, the waveform simulation system 100 runs a kernel process 102 and a front-end process 104. In particular, the simulator 106 is configured to run the kernel process 102 in the "live" mode. In the kernel process 102, the simulator 106 performs simulation(s) on one or more design objects. In some cases, the simulator 106 may be configured to receive an input from the waveform viewer 116, which provides the input in response to a command input by a user of the waveform viewer 116. For example, a user may operate the waveform viewer 116 to change the values of one or more simulation objects, and/or to change a parameter associated with the simulation(s) to be performed by the simulator 106. The simulator 106 then changes or updates simulation(s) and/or the design object(s) being simulated based on the input from the waveform viewer 116. Simulation data obtained through the kernel process 102 are passed from the simulator 106 to the packet processing module 112, which then performs in the front-end process 104. In the illustrated example, the simulation data are passed from the simulator 106 to the packet processing module 112 through a circular buffer 110. In other cases, the simulation data may be passed to the processing module 112 directly, or through another component.

Figure 2:
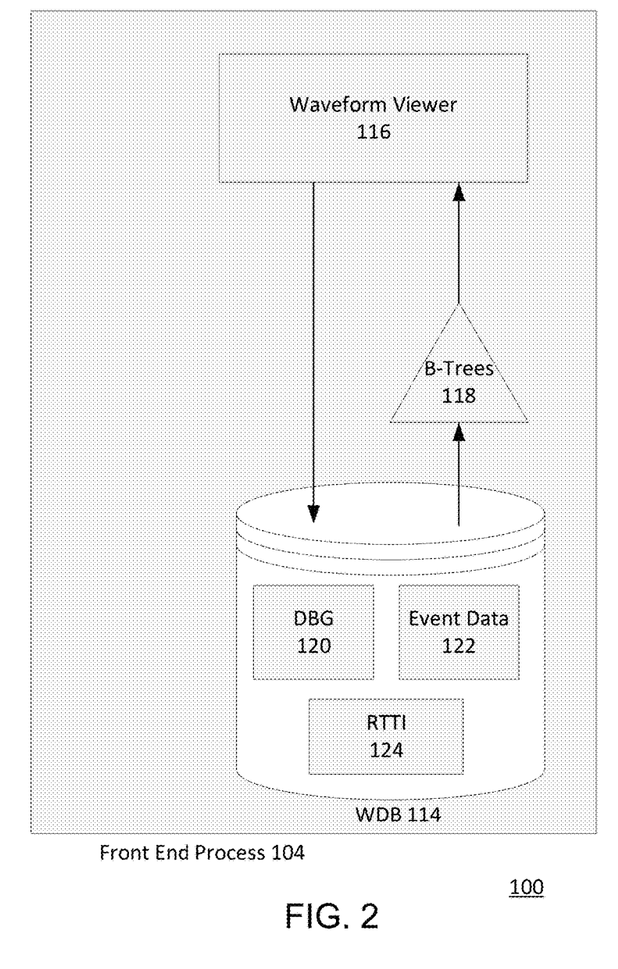
FIG. 2 illustrates the waveform simulation system of FIG. 1 being run in a "static" mode.

In the "static" mode, the simulator 106 of the waveform simulation system 100 does not perform any simulation (FIG. 2). Instead, in the "static" mode, a user enters a command at the waveform viewer 116, requesting one or more signals or waveforms for viewing by the user. The waveform viewer 116 then transmits the request to the waveform database 114 in response to the command. In some cases, the request may also specify a particular time or sample range for viewing. After the request from the waveform viewer 116 is received by the waveform database 114, the waveform database 114 then accesses mappings to determine which addresses in memory to which the signals or waveforms specified by the request correspond. In some cases, data stored in the waveform database 114 may contain information on the objects of the simulations, and includes mappings that map simulation objects to memory address locations. In such cases, the accessing of the mappings may involve accessing such data (e.g., DBG 120) that includes the mappings. Once the waveform database 114 determines the memory addresses, event data 122 corresponding to those memory addresses are retrieved from the waveform database 114. In some cases, only the event data 122 that fall within the specified time/samples associated with the request are retrieved. In other cases, all event data 122 associated with the addresses are retrieved. In some cases, the retrieved event data 122 may be first used to construct one or more B-trees 118 or other types of data structures prior to being sent to the waveform viewer 116 for viewing by the user.

The waveform simulation system 100 may be implemented on one or more computing devices, such as one or more personal computers, one or more workstations, one or more laptops, one or more tablet devices, etc., or a combination thereof. In some cases, the kernel process 102 may be run on a first computing device, while the front-end process 104 may be run on a second computing device. In some cases, the waveform database 114 may be located on a database system separate from the computing devices that run kernel process 102 and the front-end process 104.

Figure 31:
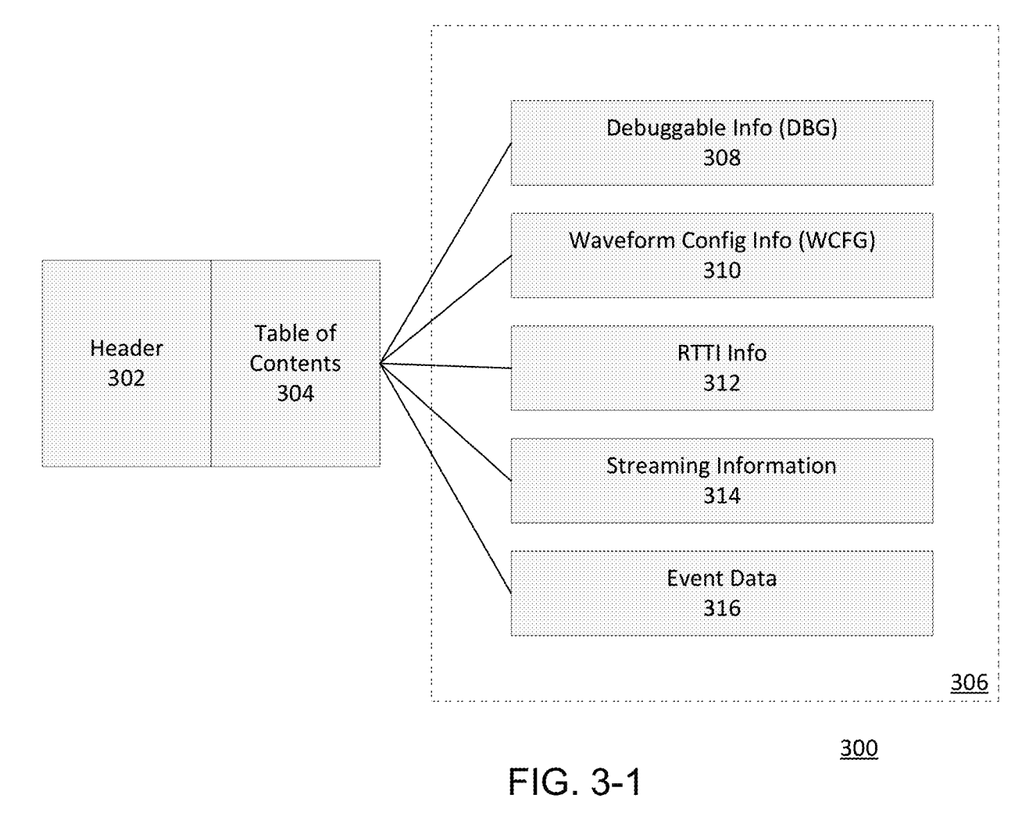

FIG. 3-1 illustrates an example of a format for data 300 stored in a waveform database. The data 300 may be an example of a simulation data stored in the waveform database 114 in the waveform simulation system 100 of FIG. 1. As shown in FIG. 3-1, the data 300 comprises a header 302, a table of contents (ToC) 304, and a plurality of sections 306. In some cases, the data 300 is in the form of a block-based file or a binary file. In other cases, the data 300 may be in other forms.

In some cases, the header 302 may be used to identify which application (e.g., simulation tool) was used to write the data 300. The header 302 may also contain a version identifier and/or an indication of whether the file is valid or not (e.g., an isValid Boolean flag). In some cases, the version identifier in the header 302 may be used by a waveform viewer (e.g., the waveform viewer 116) to determine how to read the contents of data 300.

The ToC 304 is configured for use to identify and locate the various sections 306 of data 300 for reading and for performing operation on. In some cases, the ToC 304 comprises an array containing section descriptions of the different sections 306 in the data 300. Each section description may contain an ID string for the respective section 306, a format version of the respective section 306, and/or any file/data offsets in the respective section 306.

The sections 306 of the data 300 may include DBG 308, waveform configuration information (WCFG) 310, run-time type information (RTTI) 312, streaming information 314, and event data 316. In the illustrated example, the DBG 308 and RTTI 312 are separate sections. In other cases, the DBG 308 and RTTI 312 may be combined into one section. It should be noted that the data 300 is not limited to the examples of the sections 306. In other cases, the data 300 may include one or more additional section(s). In further cases, one of more of the sections 306 are optional, and the data 300 may not include all of the sections 306.

The DBG 308 contains information on the design objects for the simulations, and includes mappings that map simulation design objects to memory address locations. The mappings allow for command (requesting particular signals and waveforms) received from the waveform viewer 116 to be used to retrieve events data 316 associated with memory addresses associated with the requested signals and waveforms.

WCFG 310 may comprise data that, when loaded by a waveform viewer, specifies which signals are to be displayed. The WCFG 310 may also include information indicating how waveform data are to be packaged for presentation to a user. In some cases, WCFG 310 may be in the form of an XML file. In other cases, WCFG 310 may be in other forms. The data 300 may contain multiple WCFGs 310, wherein each WCFG instructs a waveform viewer to load a specific set of signals. Also, in some cases, when a user requests that a waveform database file be opened, the waveform viewer may automatically present one window for each WCFG.

RTTI 312 and streaming information 314 include information that are specific to certain waveform simulation tools, such as Vivado™ Logic Analyzer, Vivado™ Simulator, and System Generator™, etc. In some cases, RTTI 312 defines the kind of values that design objects listed in the DBG 308 can hold. For example, a clock signal in the DBG 308 may be listed as having a type ID of 10. The RTTI 312 may map the type ID of 10 to "single bit of Verilog logic". In this example, when the waveform viewer accesses the RTTI 312, it can then determine that the type ID of 10 in the DBG 308 means "single bit of Verilog logic". In another example, a signal may be listed in the DBG 308 as having a type ID of 11. The RTTI 312 may map the type ID of 11 to "2-D array of VHDL std_logic". In this example, when the waveform viewer 116 accesses the RTTI 312, it can then determine that the type ID of 11 in the DBG 308 means "2-D array of VHDL std_logic". Also, in some cases, the RTTI 312 may include information that describes for each object referenced in the DBG 308, how to interpret the values associated with the addresses in the event section 306. Thus, the information in the RTTI 312 enables the waveform viewer 116 to take the address-based raw binary data from the event section 306 in the database, and translate them into human-readable form. In further cases, the RTTI 312 lets the waveform viewer 116 know how to decode certain information, such as bit information, using a encoding scheme. Examples of encoding/decoding scheme will be described with reference to Table 1 and Table 2 below.

The streaming information 314 includes host-specific data. For example, the streaming information 314 may include data that is specific to certain application in the simulator 106, in a debugging application, or in a waveform viewer. In other cases, a simulator may not have a need to, and may not, store host-specific data. Also, in other cases, a hardware debugging application (e.g., Vivado™ Logic Analyzer) may store application specific (e.g., Vivado™ Logic Analyzer-specific "probe") information as the streaming information 314. Thus, the section of the waveform database file format for streaming information 314 allows the waveform database file format to be flexible enough so that a host application may insert any kind of data of any length into the waveform database file for later retrieval, without requiring changes to the waveform database file format itself. In some cases, the waveform database format may have multiple sections for storing streaming information 314.

Event data 316 includes event information generated by the simulator 106. In some cases, the packet processing module 112 is configured to translate simulation data (which includes the event information) received from the simulator 106 into translated simulation data that is independent of implementation details of the one or more design objects for storage in the waveform database 114. In such cases, the translated simulation data includes the event data 316. The event data 316 may represent one or more events that correspond to changes in a signal or waveform associated with a simulation. The event(s) may correspond to addresses with an addressable memory space, instead of specific design objects of a simulation. This allows for events to be expressed independently of simulation tools, HDLs, and sampling schemes.

Figure 32:
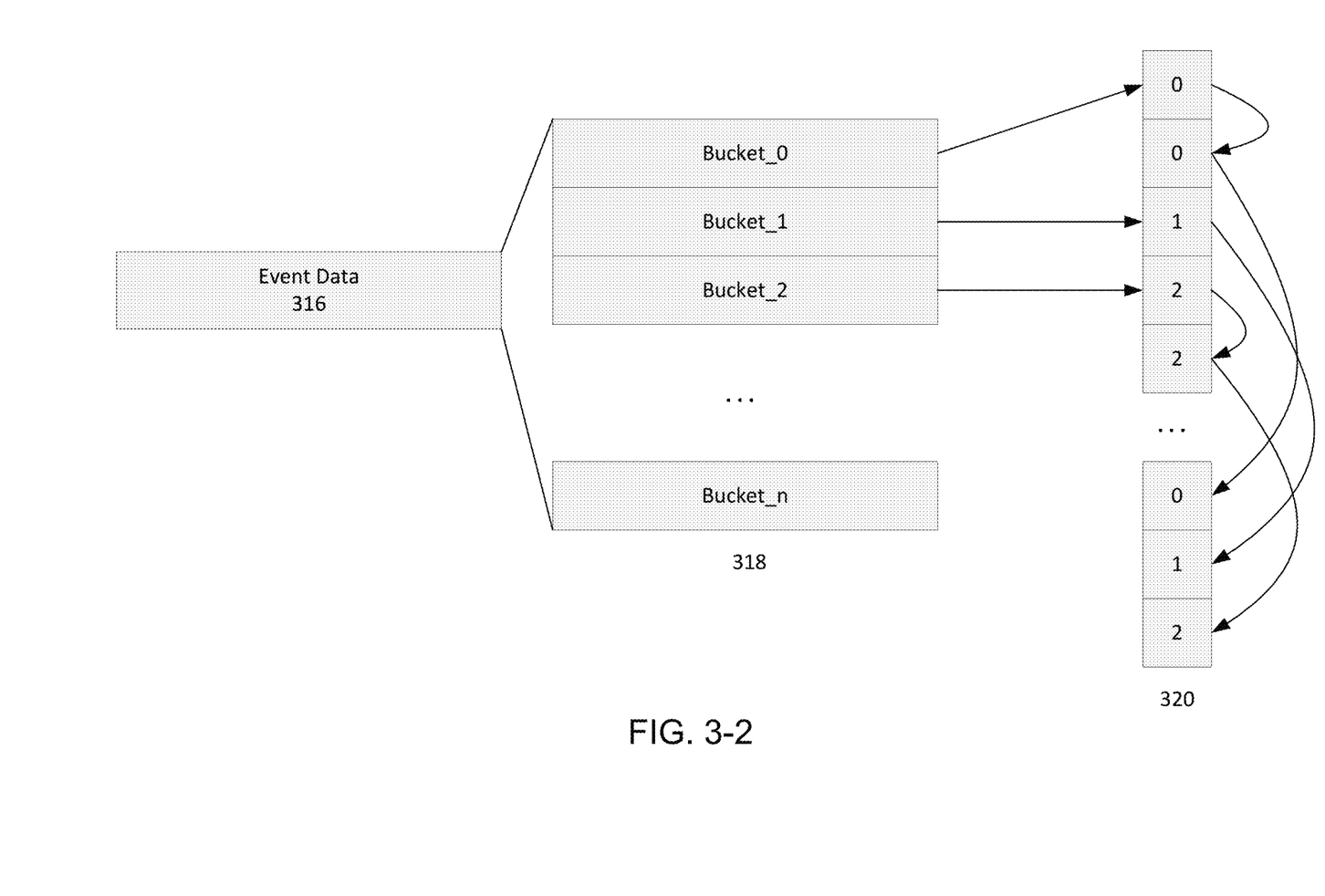

In some cases, the events represented by the event data 316 are organized into a plurality of buckets, allowing for event data associated with certain memory addresses to be retrieved more quickly. FIG. 3-2 illustrates a bucketing scheme for organizing event data 316. As shown in the figure, the bucketing scheme involves a plurality of buckets 318. In some cases, each of the buckets 318 may correspond to an address range. For example, bucket 318 with bucket identification "bucket_0" may correspond to addresses between 0 and 99, bucket 318 with bucket identification "bucket_1" may correspond to addresses between 100 and 199, etc.

As shown in FIG. 3-2, as event data 320 are received over time, they may be placed into the buckets 318 based upon the addresses that they are associated with. Each of the buckets 318 may comprise a linked list or other data structure for retrieving the event data stored in the respective bucket 318 without having to traverse through event data associated with other buckets 318. For example, a linked list for bucket_1 may be used to traverse from a first event associated with bucket_1 to a second event associated with bucket_1. This may be achieved without having to traverse through events associated with bucket_0 and bucket_2, even in the case in which the buckets bucket_0 and bucket_2 may contain events received chronologically between the events for bucket_1. It should be noted that the data structure for retrieving the event data in the bucket 318 is not limited to a linked list, and that other data structures may be used. By means of non-limiting examples, the data structure in each bucket 318 may be a b-tree, an unrolled list (combination of array and linked list), or any of other types of data structure.

For ease of explanation, the event data stored in the waveform database 114 may be expressed in the following format: "@t:addrN=V," wherein t corresponds to a time or sample, N corresponds to a memory address, and V corresponds to a value that the memory at the address was set to. The stored event data may correspond to time-based simulation data, clock-based simulation data, or sample-based simulation data. In some cases, the simulation data using one kind of sampling may be converted to another kind of sampling for generating the event data. For example, clock-based data may be converted to time-based data. In such cases, the clock-based data, time-based data, or both, may be stored in the waveform database 114 as event data. In some cases, an event may refer to, or may be represented by, a range of addresses. For example, event data @0 ns: addr03-05=00 01 02 corresponds to an event occurring at 0 ns, where addresses 03, 04, and 05 are set to the values 00, 01, and 02, respectively).

As shown in the above example, the event data are stored in a format that is independent of simulation implementation details, such as HDL, circuit debugging probes, etc., such that they are not type specific. This is because the event data uses memory address(es) to represent events, and the memory addresses may store data that is independent of simulation implementation details. For example, the memory addresses referenced in the event data may be used to store Verilog bits, VHDL bits, or bits for other types of HDLs. In other cases, the memory addresses referenced in the event data may be used to store non-HDL data representations, such as Vivado™ Logic Analyzer probe data. Accordingly, any type of event that can be represented using one or more memory addresses may be created and stored in the waveform database 114 independent of the types of simulation.

Although a particular format for the event data is described above, it is understood that the event data are not restricted to this particular format, and that any alternative format may be used.

Figure 4:
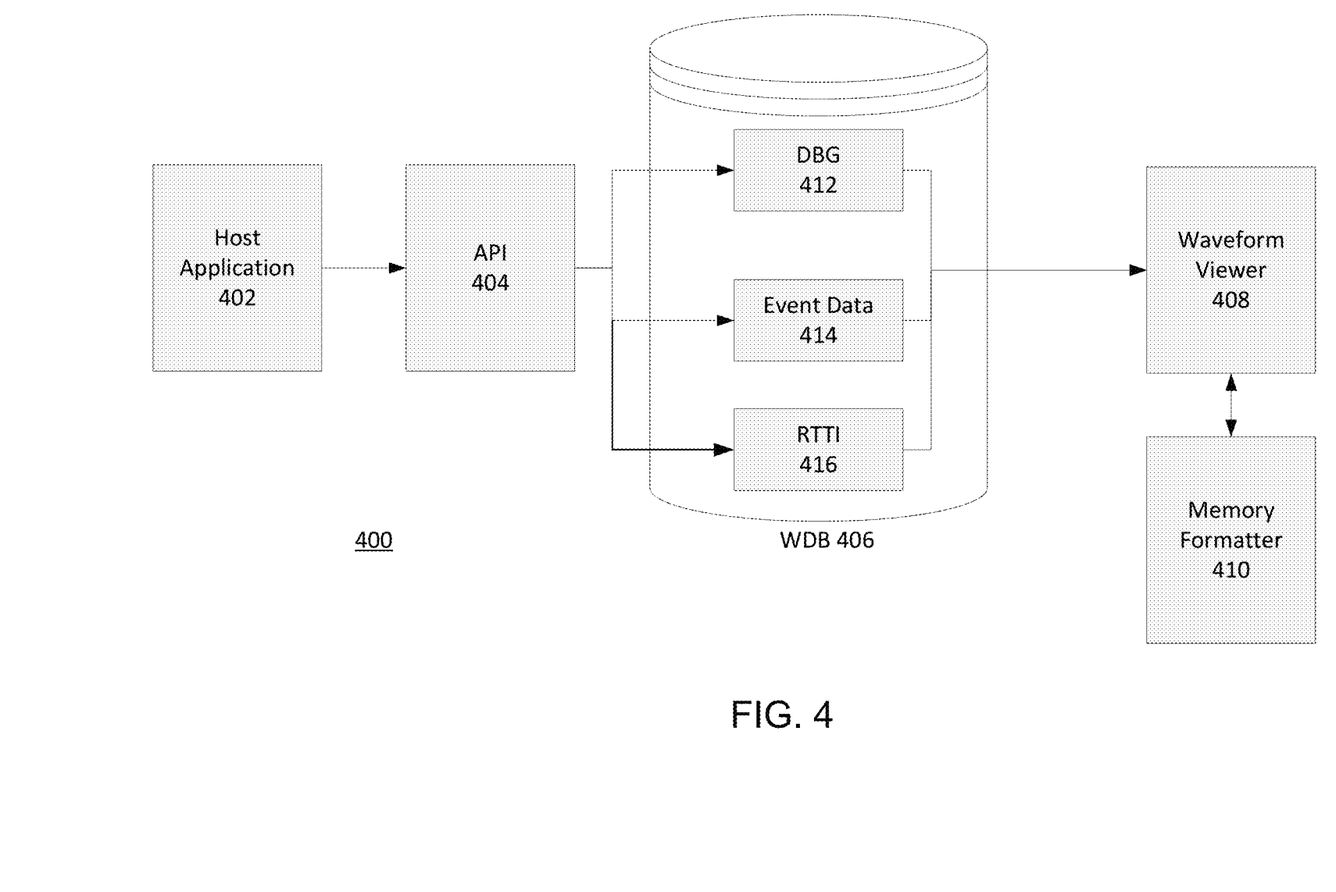
FIG. 4 illustrates a system for storing and retrieving data.

FIG. 4 illustrates a system 400 for storing and retrieving data. The system 400 may be used to implement a portion of the waveform simulation system 100 of FIG. 1. As shown in FIG. 4, the system 400 includes a host application 402 that writes data to the waveform database 406 through an application programming interface (API) 404. The host application 402 may be a waveform simulation tool such as Vivado™ Simulator or Vivado™ Logic Analyzer, or any other type of application capable of producing or providing waveform simulation data for one or more design objects. In some cases, the API 404 may be implemented as a part of the packet processing module 112 illustrated in FIG. 1. In other cases, the API 404 may be implemented as an alternative to the packet processing module 112 in FIG. 1. Also, in some cases, the host application 402 may be a part of the simulator 106 illustrated in FIG. 1, the waveform database 406 may be an example of the waveform database 114 of FIG. 1, and the waveform viewer 408 may be an example of the waveform viewer 116 of FIG. 1.

In the illustrated example, the API 404 is configured to convert event data received from host application 402 into a format (e.g., the event format described above) usable for storage of the data by the waveform database 406. Thus, API 404 may be used to receive data from multiple different types of host applications having different data formats (e.g., some host applications may return sampling based data, while other host applications return clock cycled based data), to be converted into a common format stored on WDB 406. In addition, the API 404 may be configured to receive, from the host application 402, mappings that map (1) host-defined design objects to addresses and (2) host-defined design objects to data types, and store them in DBG 412 and RTTI 416, respectively. In the illustrated example, the DBG 412 and RTTI 416 are shown as separate sections. In other cases, the DBG 412 and RTTI 416 may be combined into a single section.

Figure 51:
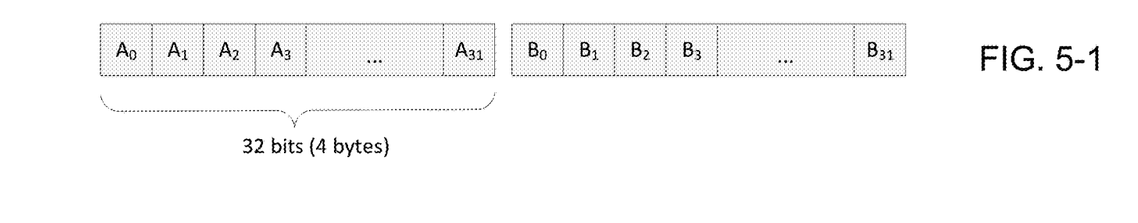
Figure 52:
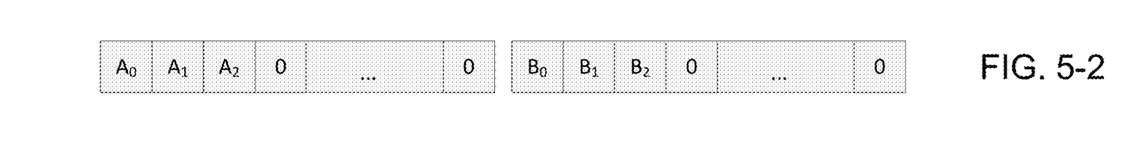

For example, in some cases, design objects may be implemented in Verilog, VHDL, or any other type of HDL. FIG. 5-1 illustrates an example of a Verilog bus in memory. A Verilog bus having four-value logic up to 32 bits is represented by two 32 bit (or 4 byte) sections of memory. For example, the two 32 bit sections may include a first 4-byte section containing bits A0 through A31, and a second 4-byte section containing bits B0 through B31. The A and B values are binary values, which when combined may be used to determine the value of a corresponding bus bit as illustrated in Table 1 below. In Table 1, "X" corresponds to conflict, and "Z" corresponds to high impedance. For instance, a 3-bit Verilog bus may be represented in memory by two 4-byte sections, each comprising 3 data bits (corresponding to A and B) and 29 trailing zeroes, as illustrated in FIG. 5-2.

TABLE 1

| Bits | | |
|---|---|---|
| B | A | Meaning |
| 0 | 0 | 0 |
| 0 | 1 | 1 |
| 1 | 0 | X |
| 1 | 1 | Z |

On the other hand, VHDL may use a nine-value logic system, and each VHDL bit corresponds to a byte in memory. Table 2 below illustrates how a byte in memory may correspond to a value of a VHDL bit.

TABLE 2

| Byte | Meaning |
|---|---|
| 00 | U |
| 01 | X |
| 02 | 0 |
| 03 | 1 |
| 04 | Z |
| 05 | W |
| 06 | L |
| 07 | H |
| 08 | — |

It is appreciated that although Verilog and VHDL are used in the above examples, design objects in a simulation may be implemented with other types of HDLs and be processed by the API 404. In addition, in other cases, the API 404 may process other third party API schemes having other types of bit logic.

Returning to FIG. 4, in some cases, the simulation data are processing by the API 404, and are stored in the waveform database 406 after being processed by the API 404. As described above, in the some cases, the simulation data may include DBG 412, which includes information regarding the design objects and mappings that map the design objects to memory addresses. The simulation data may also include RTTI 416, which includes mappings that map the design objects to data types. Also, the simulation data may include event data 414, which include information regarding the actual changes in the signals during simulation.

During use of the system 400, a user at the waveform viewer 408 may send requests to the waveform database 406 in order to view stored simulation data. In response to the requests, the waveform database 406 then retrieves the requested simulation data, and transmits them for presentation to the user through the waveform viewer 408. In some cases, the waveform viewer 408 may interface with a memory formatter 410, which is configured to format raw event data from the waveform database 406 such that the even data can be presented to the user at the waveform viewer 408. In the illustrated example, the memory formatter 410 is illustrated as a separate component from the waveform viewer 408 and the waveform database 406. In other cases, the memory formatter 410 may be a part of the waveform viewer 408, or a part of the waveform database 406. Also, in other cases, the memory formatter 410 may be coupled between the waveform database 406 and the waveform viewer 408.

Figure 6:
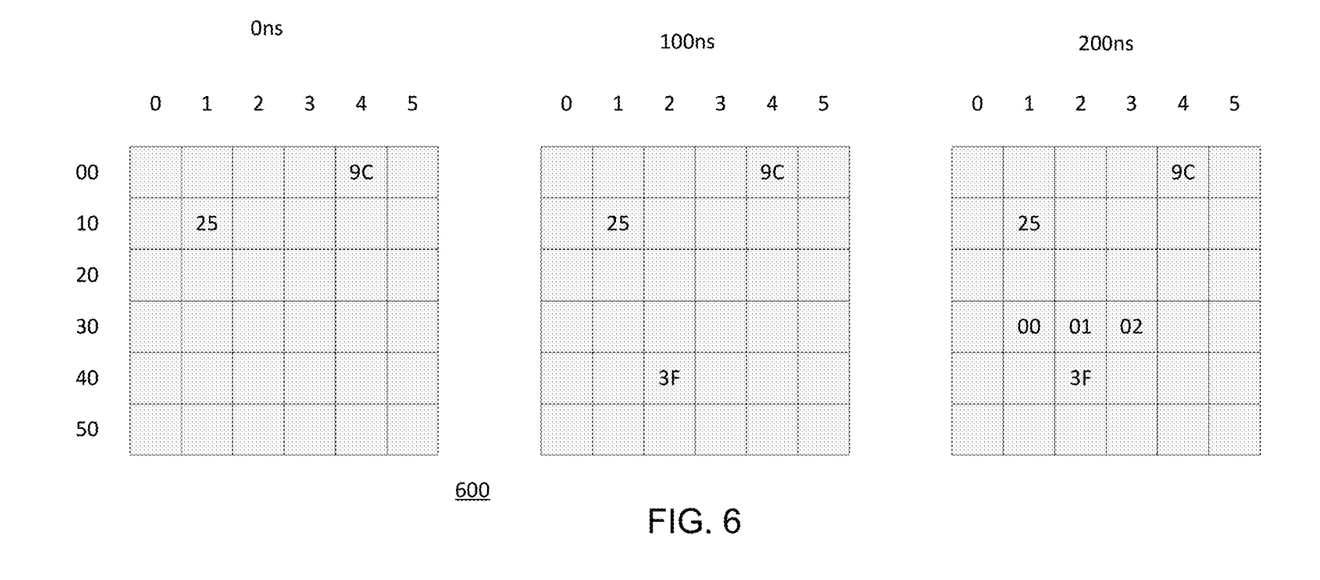
FIG. 6 illustrates examples of event data being stored over time.

FIG. 6 illustrates examples of event data being stored in a memory cell 600 over time. The event data may be an example of the event data 122, 316, 414 referenced previously. In the illustrated example, the memory cell 600 comprises an array of memory addresses, each corresponding to one byte, although it will be understood that any other addressable memory scheme may be used. At 0 ns, address 11 of memory cell 600 is set to a value of "25," while address 04 is set to 9C. At 100 ns, address 42 is set to a value of 3F, while at 200 ns, addresses 31, 32, and 33 are set to 00, 01, and 02, respectively. Thus, for the time between 0 ns and 200 ns, the waveform database will have stored the following event data:

@t=0 ns: addr11=25

@t=0 ns: addr04=9C

@t=100 ns: addr42=3F

@t=200 ns: addr31-33=00 01 02

Because the event data stored in the waveform database are independent of implementation details (such as the design object that originated the event, the HDL that the design object was implemented in, etc.) of the design objects, mappings in the waveform database that map one or more design objects with one or more addresses are used to identify the relevant events when a user requests to view a particular signal or waveform. Table 3 below illustrates an example of waveform database format for mapping design objects in a simulation to addresses. The mapping shown in the example of Table 3 may be considered an example of DBG 120/308/412. DBG contents.

TABLE 3

| Scope/Name | Type | Address | Length (bits) |
|---|---|---|---|
| /top/clk | VHDL std_logic | 21 | 1 |
| /top/out/bus | Verilog bus | 40 | 3 |

In the above examples, a first design object (with type "VHDL std_logic" in the example) is mapped to address 21, and a second design object (with type "Verilog bus" in the example) is mapped to address 40. The DBG may specify for each design object a scope and/or name of the object, an object type (which, for example, may identify the HDL that the object was implemented in), the memory address of the object, and the length for the object in memory. For example, Table 3 illustrates a 1-bit VHDL clock mapped to address 21 of memory, and a 3-bit Verilog bus mapped to address 40 of memory. In accordance with the VHDL and Verilog formats described above, the VHDL clock will occupy the byte associated with address 21 of memory, while the Verilog bus will occupy addresses 40-47 (8 bytes, or two 4-byte sections), with the first 3 bits of addresses 40-43 and 44-47 corresponding to bus data (see FIG. 5-2). In some cases, the above mappings may be DBG 120/308/412 stored in the waveform database 114/406.

It should be noted that the DBG 120/308/412 is not limited to the example shown in Table 3, and that the DBG 120/308/412 may have other formats and/or other information in other cases. As another example, the "Type" column in Table 3 may be replaced with a type ID. Using the above example, the type description "VHDL std_logic" may be replaced with type ID 15. In such cases, the RTTI 124/312/416 may including information (e.g., mapping) associating the type ID 15 with the type description (e.g., "VHDL std_logic"). The RTTI 124/312/416 may also include information (e.g., mapping) associating the type ID or the type description with a corresponding encoding scheme, such as that as shown in Table 2. In some cases in which the DBG 412 and RTTI 416 may be combined into a single section, all of these data may be included in Table 3 as parts of the DBG 120/308/412.

As discussed, the information in the RTTI 124/312/416 enables the waveform viewer 116 to take the address-based raw binary data from the event data 122 in the database, and translate them into human-readable form. In some cases, the address-based raw binary data may be the values that addresses for the event data 316 can take on over the course of simulation time, such as those shown in the examples of FIG. 6. Suppose the event data 316 contains the following address-based raw binary data:@100 ns: 40=02. From the example of Table 3, the waveform viewer can tell that this address corresponds to the design object/top/out/bus. However, without the RTTI information, the waveform viewer would not be able to tell what the value 02 means. Following the above example, the RTTI tells the waveform viewer that it's a Verilog bus, which means that the value at address 44 is also necessary because such object address has a 3 bit length. In this example, the address value for the address 44 may be assumed to be 00. Using these information, together with the information in the example of Table 1 for Verilog encoding, it can be determined that the 02 value is the A value, and that the 00 value is the B value, which should be interpreted as the 3-bit pattern "010."

In another example, the DBG 120/308/412 in the above example shown in Table 3 may have the following format shown in Table 4, and the RTTI may have the following format shown in Table 5.

TABLE 4

DBG contents:

| Scope/Name | Type ID | Address | Length (bits) |
|---|---|---|---|
| /top/clk | 1 | 21 | 1 |
| /top/out/bus | 2 | 40 | 3 |

TABLE 5

RTTI contents:

| Type ID | Type | Type details | Value encoding |
|---|---|---|---|
| 1 | Enumeration | enumerators: U, X, 0, 1, Z, W, L, 1 | value per byte |
| 2 | Array | # of dims: 1; element type ID: 3 | A value/B value |
| 3 | Enumeration | enumerators: 0, 1, Z, X | A value/B value |

In this example, the "/top/out/bus" object is illustrated as having object type ID 2. Looking at type ID 2 in the RTTI table, we see that it is a 1-D array whose elements are of type ID 3, which is an enumeration. An enumeration is a fixed set of named values (also called enumerators). In some cases, when conversion to human-readable format is performed, binary values from the event data 316 are translated to these enumerators.

Also, in the above example, the "Value encoding" column in the RTTI table indicates how the memory values from the event data 316 are to be interpreted. "1 value per byte" means to assign each enumerator a byte value, starting with 00 for the first enumerator. As such, a byte value of 03 indicates the fourth enumerator. In this example, Type ID 1 is defined in such a way that it corresponds to the standard VHDL logic encoding, thereby matching the example of Table 2 described previously.

In addition, in the above example, "A value/B value" refers to the encoding style of FIG. 5-1. This encoding indicates that one bit each should be taken from the A word and B word and combined, giving a combined value in the range of binary 00 to 11 (or decimal 0 to 3). That combined value is then used to choose one of the enumerators. Because there are 4 possible combined values, an enumerator using this encoding can define a maximum of 4 enumerators. In this example, Type ID 3 is defined in such a way that it corresponds to the standard Verilog encoding of Table 1 described previously.

It should be noted that while RTTI itself may not be HDL-specific, an HDL simulator may construct HDL types in terms of RTTI types. Also, in some cases, the API 404 may define its own RTTI types that are similar to, but distinct from, HDL types. Table 6 shows one example of this scenario.

TABLE 6

RTTI contents:

| Type ID | Type | Type details | Value encoding |
|---|---|---|---|
| 1 | Enumeration | enumerators: 0, 1, X, Z | 1 value per byte |
| 2 | Array | # of dims: 1; element type ID: 1 | 1 value per byte |

In the above example, through the API 404, the host application 402 may define design objects that are "bits" having type ID 1. The host application 402 may also define 1-D arrays (e.g., busses), having type ID 2. The enumerator list for a "bit" is similar to that of Verilog. The encoding is similar to VHDL, in that the enumerators are assigned byte values starting from 00 for the first enumerator "0."

As illustrated in the above example, in some cases, the host application 402 may provide its own RTTI for storage in the waveform database. In some cases, the simulator 106 may not be a host application. In such cases, the simulator 106 may provide its own RTTI directly to the waveform database. For example, with reference to FIG. 1, in some cases, the simulator 106 may provide RTTI 124 directly to the waveform database 114 for storage. In other cases, the simulator 106 may provide RTTI information to the packet processing module 112, which processes the RTTI information to obtain RTTI 124 for storage in the waveform database 114.

Figure 7:
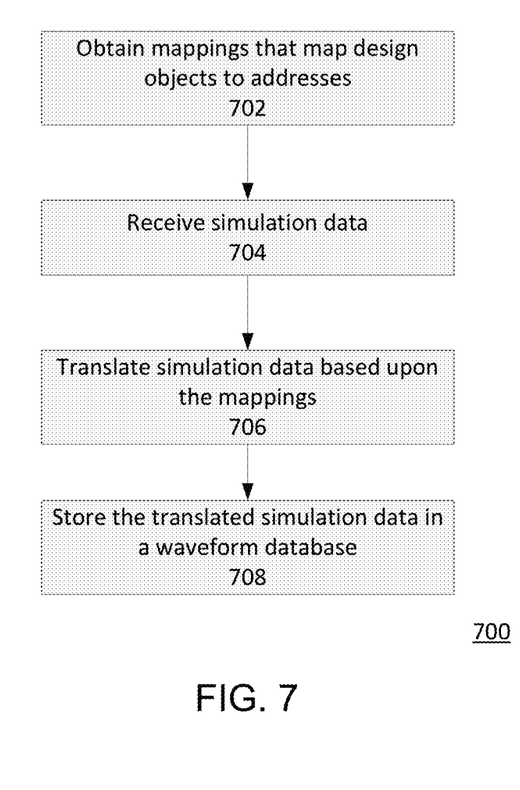
FIG. 7 illustrates a method of storing data in a waveform database.

FIG. 7 illustrates a method 700 of processing simulation data. In some cases, the method 700 may be performed using the waveform simulation system 100 of FIG. 1. In other cases, the method 700 may be performed by other types of waveform simulation system, or by waveform simulation system having a different configuration from that of FIG. 1. In further cases, the method 700 may be performed by a waveform analyzer. For ease of explanation, the description will refer to the examples of design objects illustrated in Table 3 above. However, it should be understood that the method 700 may apply to any types of design objects.

At item 702, mappings are obtained that map design objects to addresses in memory. For example, as indicated in Table 3 above, a VHDL clock is mapped to address 21 of memory, and a 3-bit Verilog bus is mapped to address 40 of memory. These mappings may be stored as DGB data and/or RTTI data in a waveform database (e.g., the waveform database 114 of FIG. 1). In some cases, the mappings may map at least one object implemented using a first type of data encoding, and at least one object implemented using a second type of data encoding that is different from the first type. For example, the mappings may map a first object in Verilog, SystemVerilog, HDL (e.g., VHDL), or a non-HDL data format. The mappings may also map a second object in Verilog, SystemVerilog, HDL (e.g., VHDL), or a non-HDL data format, but having a format type that is different from that of the first object.

Next, at item 704, simulation data are received. In some cases, the act of receiving the simulation data may be performed by the packet processing module 112 that receives the simulation data from the simulator 106. Also, in some cases in which the packet processing module 112 includes the API 404, and in which the simulator 106 includes the host application 402, the act of receiving the simulation data may be performed by the API 404 that receives the simulation data from the host application 402. In other cases in which the API 404 is implemented as an alternative to the packet processing module 112, the act of receiving the simulation data may be performed by the API 404. In some cases, the simulation data may indicate certain events associated with the simulation performed by the simulator 106. For example, the simulation data may indicate that at time 0 ns, the clock value is set to 1, and the bus value is set to 0, while at 100 ns, the clock value is set to 0, and the bus value is set to 2. Thus, the simulation data may be design object-specific, and may correspond to a change in a signal associated with a certain design object being simulated.

Next, at item 706, the simulation data is translated. It should be noted that the term "translate" or any of other similar terms, may refer to any processing of data. Also, a translated data may include more information, fewer information, different information, or the same information but in a different format, compared to the original data before the translation. In some cases, the packet processing module 112 may function as a translator that translates the simulation data based at least in part on the mappings obtained at item 702. In other cases in which the packet processing module 112 includes the API 404, the API 404 may function as a translator that translates the received simulation data. In some cases, the processing module 112/API 404 may be configured to translate the simulation data into a common format based upon the HDL used to implement the design objects, as well as the mappings that map the design objects to the memory addresses. For example, the processing module 112/API 404 may convert the above-described events indicated by the simulation data into the following:

@t=0 ns: addr2*l*=03
@t=0 ns: addr40=00
@t=0 ns: addr44=00
@t=100 ns: addr2*l*=02
@t=100 ns: addr40=02

Thus, as shown in the above example, the simulation data may be translated into translated simulation data so that it is not design object-specific. In particular, as shown in the above example, the translated simulation data comprises a time value, a memory address identifier, and a signal value, none of which indicates implementation details of the design objects. Thus, the translated simulation data has a format that is independent of an implementation detail of the design object. In some cases, the translated simulation data may be considered event data because they indicate events at certain time points. Also, as shown in the above example, the translated simulation data corresponds to a change in a memory value having an address that is mapped to certain design object based on the mapping.

Once the simulation data have been translated into a format that is independent of the design object being simulated, they are then stored into the waveform database (item 708).

Figure 8:
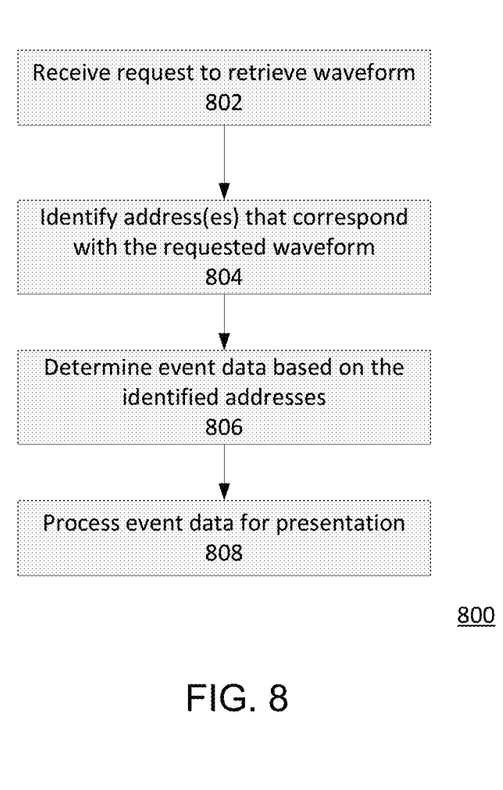
FIG. 8 illustrates a method for retrieving data from a waveform database.

After the translated simulation data are stored in the waveform database, the simulation data may be retrieved. FIG. 8 illustrates a method of retrieving simulation data from a waveform database.

At item 802, a request is received by the waveform database to retrieve a waveform of simulation data. The waveform database may be the waveform database 114 of FIG. 1 or the waveform database 406 of FIG. 4, for example. The request may be generated based on a request by a user entered at a waveform viewer (e.g., the waveform viewer 116 of FIG. 1 or the waveform viewer 408 of FIG. 4). In some cases, the request is sent by a waveform viewer 116/408 automatically in response to a user specifying a particular simulation to view. Using the above example, a user may request to view the waveform stored for the 3-bit Verilog bus. In other examples, the user may request to view waveform associated with other design object(s). Also, in some cases, the request from the waveform viewer may include a sample range or a time range associated with the requested waveform.

At item 804, one or more addresses are identified that correspond with the requested waveform using mappings stored in the waveform database. In some cases, the one or more addresses may be identified based at least in part upon one or more mappings that map one or more design objects associated with the waveform with one or more memory addresses. For example, in some cases, the mappings may be indicated by the DBG 120/308/412 stored in the waveform database 114/406. Thus, in some cases, the act of identifying the address(es) may include accessing DBG 120/308/412 in the waveform database 114/406. Following the above example, the mappings from the DBG 120/308/142 may be used to identify addresses 40 through 47 as corresponding to the 3-bit Verilog bus. In other examples, the mappings may be used to identify address(es) for other design object(s).

Also, in some cases, the act of identifying the one or more addresses may be based at least in part upon a type of data encoding (e.g., a type of HDL) used to implement one or more design objects associated with the requested waveform. For example, in some cases, the mappings may map one or more design objects with one or more memory addresses based on the type of HDL used to implement the one or more design objects. In such cases, when the mappings are accessed, certain memory addresses may be identified based on the type of HDL used to implement one or more design objects associated with the requested waveform.

In some cases, the identifying of the address(es) in item 804 may be performed by the waveform database 114/406. In other cases, the identifying of the address(es) in item 804 may be performed by the waveform viewer 116/408. In further cases, the identifying of the address(es) in item 804 may be performed by the memory formatter 410.

At item 806, one or more event data are determined based on the identified address(es). Following the above example, the event at time=0 ns has value 00 for address 40, the event at time=0 ns has value 00 for address 44, and the event at time=100 ns has value 02 for address 40, based on the following simulation data retrieved from the waveform database:

@t=0 ns: addr40=00
@t=0 ns: addr44=00
@t=100 ns: addr40=02

As shown in the above example, the waveform database stores the event data in a format that is independent of implementation detail of the one or more design objects. In some cases, the determining of the event data in item 806 may be performed by the waveform database 114/406. In other cases, the determining of the event data in item 806 may be performed by the waveform viewer 116/408. In further cases, the determining of the event data in item 806 may be performed by the memory formatter 410.

Figure 9:
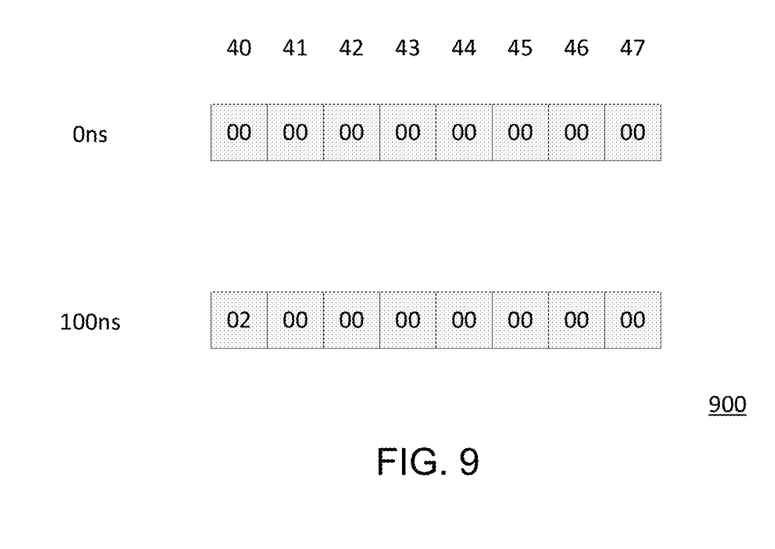
FIG. 9 illustrates examples of memory images constructed from event data.

At item 808, the event data are processed for presentation to a user. In some cases, a memory image may be constructed for each time specified in the retrieved events. FIG. 9 illustrates memory images 900 constructed for the times (e.g., 0 ns and 100 ns) specified in the above examples of the events. At time 0 ns, addresses 40 and 44 have value of 0. However, at time 100 ns, address 40 has a value of 02, while address 44 has a value of 0. In the illustrated example, the memory addresses 40-47 are for the waveform corresponding to the design object (the 3-bit Verilog bus in the above example). Therefore, the memory images 900 include memory addresses 40-47. In some cases, the memory images are translated into a displayable format to be viewed by the user. In other cases, event data for individual addresses may be translated into a displayable format directly, without the construction of memory images 900. In some cases, the processing of the event data in item 808 may be performed by the waveform viewer 116/408. In other cases, the processing of the event data in item 808 may be performed by the memory formatter 410. In further cases, the processing of the event data in item 808 may be performed by the waveform database 114/406.

Also, in some cases, the act of processing the event data in item 808 may include creating one or more data structures using the one or more events. In some cases, the purpose of the data structure(s) is to collect all of the events relevant to a single address, a single design object, a single waveform, or any combination of the foregoing. The data structure(s) may be any type of data structure. For example, the data structure(s) may be B-tree(s). In such cases the waveform viewer 116/408 may use information in the B-tree(s) to present information to the user.

Also, in some cases, the act of processing the event data may include accessing the mappings that map one or more design objects to the one or more memory addresses. For example, the DBG 120/412 indicating the mappings may be accessed, and the mappings may be used to determine the design objects to which the event data corresponds. In some cases, the accessing of the mappings may be performed by the waveform viewer 116/408. In other cases, the accessing of the mappings may be performed by the memory formatter 410. In further cases, the accessing of the mappings may be performed by the waveform database 114/406. In one implementation, the memory formatter 410 may obtain memory images (e.g., the memory images illustrated in FIG. 9) and information regarding the design object(s) to which the memory images belong based on the mapping(s). Following the above example, the memory formatter 410 may determine, based on the mapping(s), that the memory images is for a Verilog bus, and that the bus has a value of "0" at 0 ns, and a value of "2" at 100 ns.

In some cases, the memory formatter 410 may additionally send instructions to the waveform viewer 116/408 on how to prepare (e.g., construct) the waveform. For example, the waveform may be constructed in a first way if sample-based viewing is desired, and it alternatively may be constructed in a second way if clock-based viewing is desired. The user is thus able to selectively view the waveform on the waveform viewer 116/408 in different formats.

Although particular examples have been shown and described, it will be understood that it is not intended to limit the claimed inventions to the preferred examples, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A method for storing data in a waveform database, comprising:
   providing a waveform database having:
      a first section configured to store translated simulation data;
      a second section having a table listing a plurality of design objects of a circuit design wherein for each design object, the table specifies an object type indicating a selected hardware description language of a plurality of different hardware description languages and a mapping of the design object to an address and a length of a data item for the address; and
      a third section having a table specifying one of a plurality of different encodings for each object type;
   electronically receiving simulation data, wherein the simulation data is a result of an executed waveform simulation process and corresponds to a change in a signal associated with a selected design object of the plurality of design objects;
   translating the received simulation data using a computing device, based at least in part upon the mapping for the selected design object, into translated simulation data having a format that is independent of implementation details of the selected design object and that includes a time value, a memory address identifier corresponding to the address mapped to the selected design object from the second section, and a signal value corresponding to the change in the signal from the selected design object;

storing, using the computing device, the translated simulation data in the first section of the waveform database based upon the memory address identifier; and subsequently presenting the translated simulation data by retrieving the translated simulation data from the first section based on requested addresses, correlating the retrieved simulation data with the type of the selected design object based on the mapping stored in the second section, and decoding the translated simulation data based on the encoding for the type of the selected design object determined from the third section.

2. The method of claim 1, wherein the selected design object is implemented using a first type of encoding, and at least one other design object of the circuit design is implemented using a second type of encoding that is different from the first type.

3. The method of claim 1, wherein the translating the received simulation data determines the memory address identifier based at least in part upon a hardware description language in which the selected design object is implemented.

4. The method of claim 1, wherein the translated simulation data are stored in one of a plurality of buckets based on the memory address identifier, wherein each of the plurality of buckets corresponds to an address range such that each bucket stores translated simulation data for each of the plurality of design objects mapped to a memory address in the address range of the respective bucket.

5. The method of claim 1, wherein the waveform database further comprises:
    a fourth section configured to instruct a waveform viewer to load a specific set of signals.

6. The method of claim 1, wherein:
    the mapping maps the selected design object to two or more memory addresses; and
    the translated simulation data is associated with the two or more memory addresses.

7. The method of claim 1, wherein an implementation detail of the selected design object comprises a hardware description language of the selected design object, and wherein a format of the translated simulation data is independent of the hardware description language of the selected design object.

8. A method of retrieving data from a waveform database, comprising:
    storing, using a computing device, translated simulation data for a plurality of design objects of a circuit design in a first section of the waveform database, wherein the first section is separate from a second section of the waveform database configured to store a mapping and a third section of the waveform database configured to store a data type;
    wherein the translated simulation data is generated by translating, based at least in part upon the mapping, received simulation data for an executed waveform simulation process corresponding to changes in signals associated with the plurality of design objects into time values, memory address identifiers, and signal values corresponding to the changes in the signals from the plurality of design objects;
    electronically receiving a request from a waveform viewer for a waveform of the simulation data;
    identifying one or more memory addresses in a memory corresponding to the requested waveform based at least in part on the mapping that maps the plurality of design objects to the one or more memory addresses, wherein the memory address identifiers correspond to the one or more memory addresses;
    determining one or more event data based on the one or more identified memory addresses by electronically accessing the one or more event data from the first section of the waveform database;
    processing the one or more event data for presentation based on a selected design object of the plurality of design objects and the data type for the one or more event data determined from the third section of the waveform database using the mapping; and
    wherein the translated simulation data are stored in one of a plurality of buckets based on the memory address identifiers, wherein each of the plurality of buckets corresponds to an address range such that each bucket stores translated simulation data for each of the plurality of design objects mapped to a memory address in the address range of the respective bucket.

9. The method of claim 8, wherein the processing the one or more event data comprises, in response to electronically accessing the one or more event data from the waveform database, first creating one or more B-trees using the one or more event data prior to sending the one or more event data to the waveform viewer.

10. The method of claim 8, wherein the processing the one or more event data comprises, in response to electronically accessing the one or more event data from the waveform database, creating memory images for certain respective times specified in the accessed one or more event data.

11. The method of claim 8, wherein the identifying the one or more memory addresses is also based at least in part upon a type of data encoding used to implement the selected design object.

12. A waveform simulation system, comprising:
    computer hardware configured to initiate operations including:
    providing a waveform database having:
        a first section configured to store translated simulation data;
        a second section having a table listing a plurality of design objects of a circuit design wherein for each design object, the table specifies an object type indicating a selected hardware description language of a plurality of different hardware description languages and a mapping of the design object to an address and a length of a data item for the address; and
        a third section having a table specifying one of a plurality of different encodings for each object type;
    electronically receiving simulation data, wherein the simulation data is a result of an executed waveform simulation process and corresponds to a change in a signal associated with a selected design object of the plurality of design objects;
    translating the received simulation data, based at least in part upon the mapping for the selected design object, into translated simulation data having a format that is independent of implementation details of the selected design object and that includes a time value, a memory address identifier corresponding to the address mapped to the selected design object from the second section, and a signal value corresponding to a change in the signal from the selected design object;

storing the translated simulation data in the first section of the waveform database based upon the memory address identifier; and subsequently presenting the translated simulation data by retrieving the translated simulation data from the first section based on requested addresses, correlating the retrieved simulation data with the type of the selected design object based on the mapping stored in the second section, and decoding the translated simulation data based on the encoding for the type of the selected design object determined from the third section.

13. The system of claim 12, wherein the selected design object is implemented using a first type of encoding, and at least one other design object of the circuit design is implemented using a second type of encoding that is different from the first type.

14. The system of claim 12, wherein the translating determines the address identifier based at least in part on a hardware description language in which the selected design object is implemented.

15. The system of claim 12, wherein the translated simulation data are stored in one of a plurality of buckets based on the memory address identifier, wherein each of the plurality of buckets corresponds to an address range such that each bucket stores translated simulation data for each of the plurality of design objects mapped to a memory address in the address range of the respective bucket.

16. The system of claim 12, wherein the waveform database further comprises:

a fourth section configured to instruct a waveform viewer to load a specific set of signals.

17. The system of claim 12, wherein:

the mapping maps the selected design object to two or more memory addresses; and the translated simulation data is associated with the two or more memory addresses.

18. The system of claim 12, wherein the waveform database is also configured to store streaming information that includes host-specific data.

19. The system of claim 12, wherein the waveform database is also configured to store information indicating how waveform data are to be packaged for presentation.

* * * * *